(12) United States Patent
Hohmann, Jr.

(10) Patent No.: US 12,228,166 B2
(45) Date of Patent: *Feb. 18, 2025

(54) WALL ANCHOR SYSTEM AND WASHER FOR CONNECTING TO A VENEER TIE

(71) Applicant: Hohmann & Barnard, Inc., Hauppauge, NY (US)

(72) Inventor: Ronald Hohmann, Jr., Bradenton, FL (US)

(73) Assignee: Hohmann & Barnard, Inc., Hauppauge, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 17/675,590

(22) Filed: Feb. 18, 2022

(65) Prior Publication Data

US 2022/0170501 A1    Jun. 2, 2022

Related U.S. Application Data

(63) Continuation-in-part of application No. 16/867,584, filed on May 6, 2020, now Pat. No. 11,274,434.

(51) Int. Cl.
*F16B 43/00*     (2006.01)
*E04F 13/08*     (2006.01)

(52) U.S. Cl.
CPC .......... *F16B 43/00* (2013.01); *E04F 13/0801* (2013.01)

(58) Field of Classification Search
CPC . E04B 1/40; E04B 1/41; E04B 1/4178; E04B 1/4185; E04B 2001/4192; E04B 2002/025; F16B 43/00; E04F 13/0801
USPC .................................................. 52/712–715
See application file for complete search history.

(56) References Cited

U.S. PATENT DOCUMENTS

| | | | |
|---|---|---|---|
| 5,035,099 A | 7/1991 | Lapish | |
| 5,118,235 A * | 6/1992 | Dill | E04D 3/3603 411/908 |
| 5,392,581 A * | 2/1995 | Hatzinikolas | E04B 1/4185 52/712 |
| 6,401,406 B1 * | 6/2002 | Komara | E04C 1/39 52/421 |
| 6,973,756 B2 | 12/2005 | Hatzinikolas | |
| 7,415,803 B2 | 8/2008 | Bronner | |
| D702,544 S | 4/2014 | Hohmann, Jr. | |
| 8,726,597 B2 | 5/2014 | Hobmann, Jr. | |
| 8,826,624 B2 * | 9/2014 | Dalen | E04B 1/38 411/389 |
| 8,863,469 B2 | 10/2014 | Curtis et al. | |
| 8,893,452 B2 | 11/2014 | Hatzinikolas | |
| 9,140,001 B1 | 9/2015 | Hohmann, Jr. | |

(Continued)

FOREIGN PATENT DOCUMENTS

CA    2808917    9/2013

*Primary Examiner* — Rodney Mintz
(74) *Attorney, Agent, or Firm* — Andrus Intellectual Property Law, LLP

(57) ABSTRACT

A washer for use in a cavity wall to connect to a veneer tie that joins an inner wythe and an outer wythe of the cavity wall. The washer has a washer body having a perimeter, a washer body first side, a washer body second side and a washer body side wall. A hole is substantially centrally located and through the washer body. At least one holder formed within the perimeter and protruding from at least one of the washer body first side and washer body second side, wherein the at least one holder is configured for receiving a portion of a veneer tie.

20 Claims, 11 Drawing Sheets

(56) References Cited

U.S. PATENT DOCUMENTS

| | | | |
|---|---|---|---|
| 9,273,461 B1 | 3/2016 | Hohmann, Jr. | |
| 9,631,667 B2* | 4/2017 | Rodenhouse | F16B 43/00 |
| 9,803,355 B1 | 10/2017 | Ripley et al. | |
| 9,945,414 B1 | 4/2018 | Rodenhouse et al. | |
| 10,202,754 B2 | 2/2019 | Hohmann, Jr. | |
| D848,250 S | 5/2019 | Ripley et al. | |
| 11,274,434 B2* | 3/2022 | Hohmann, Jr. | E04B 1/7616 |
| 2004/0055236 A1* | 3/2004 | Keith | E04B 1/4114 |
| | | | 52/410 |
| 2004/0221535 A1* | 11/2004 | Hatzinikolas | E04F 13/25 |
| | | | 52/506.05 |
| 2005/0279043 A1 | 12/2005 | Bronner | |
| 2013/0008121 A1 | 1/2013 | Dalen | |
| 2013/0232909 A1 | 9/2013 | Curtis et al. | |
| 2014/0075855 A1* | 3/2014 | Hohmann, Jr. | E04F 13/0805 |
| | | | 52/562 |
| 2014/0150373 A1* | 6/2014 | Hatzinikolas | E04F 13/142 |
| | | | 52/712 |
| 2014/0215958 A1 | 8/2014 | Duyvejonck et al. | |
| 2015/0121792 A1 | 5/2015 | Spoo et al. | |
| 2016/0252129 A1 | 9/2016 | Rodenhouse et al. | |
| 2017/0342707 A1* | 11/2017 | Hohmann, Jr. | E04B 1/4178 |
| 2021/0301521 A1* | 9/2021 | Hohmann, Jr. | E04B 1/76 |
| 2021/0348381 A1* | 11/2021 | Hohmann, Jr. | E04B 1/7616 |

* cited by examiner

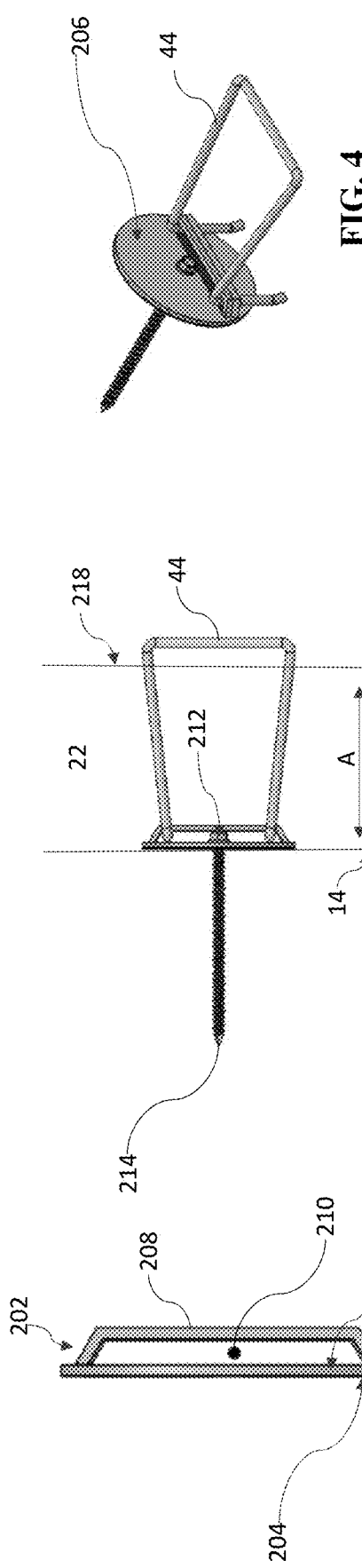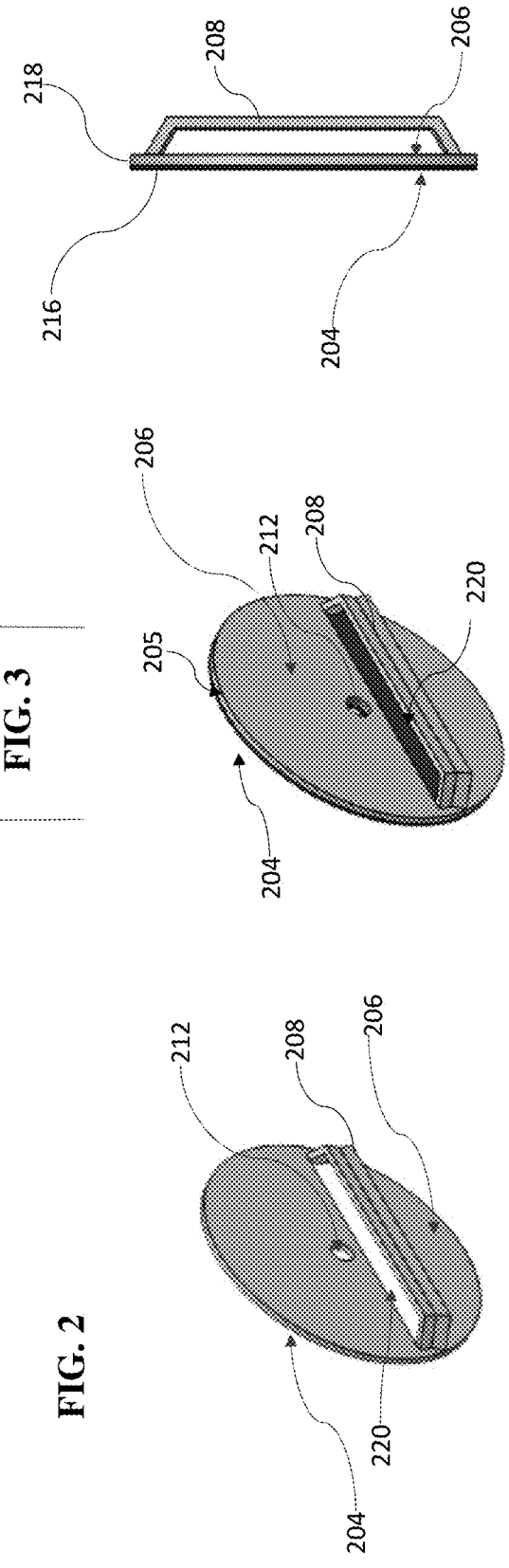

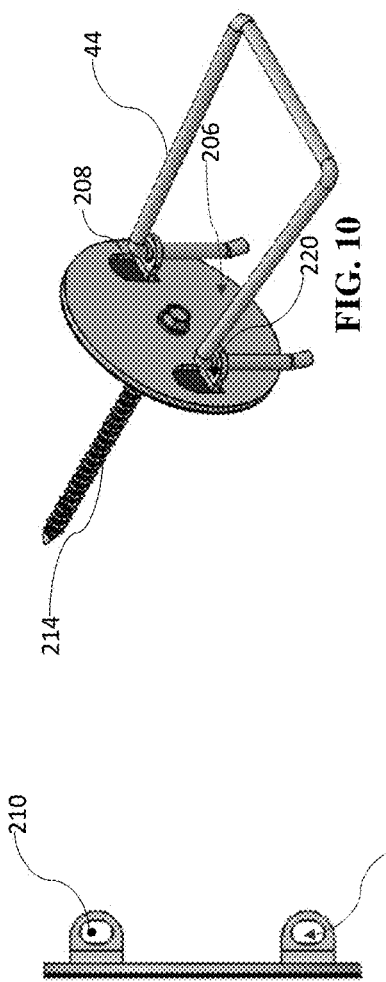
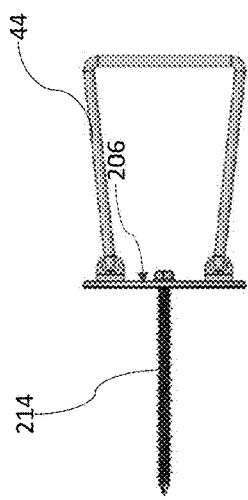
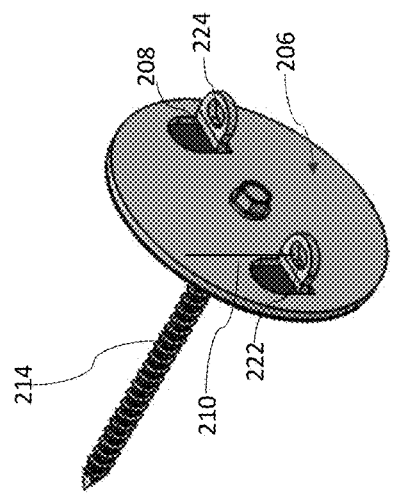
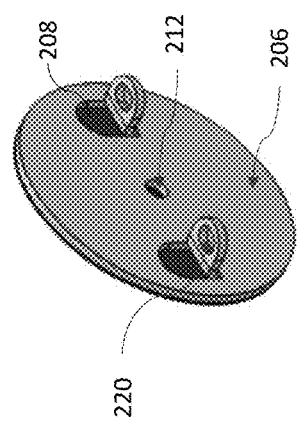
FIG. 8
FIG. 9
FIG. 10
FIG. 11
FIG. 12
FIG. 13

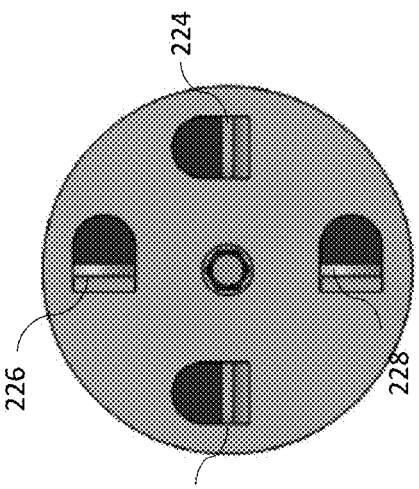
FIG. 19
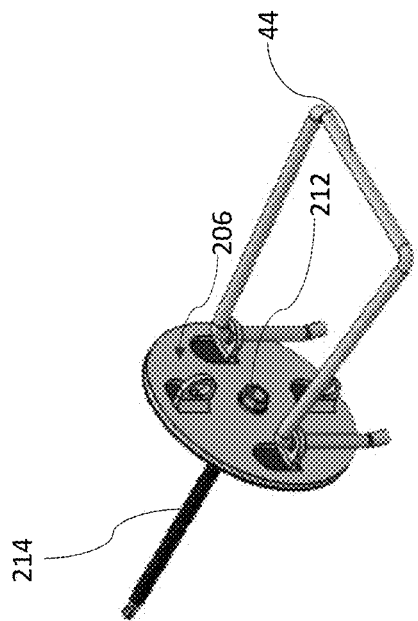
FIG. 21
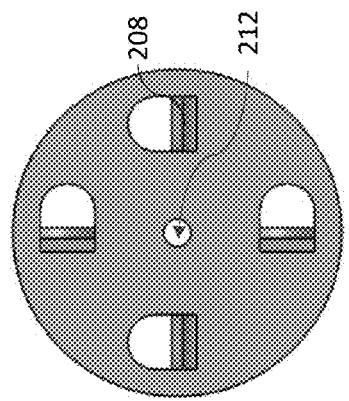
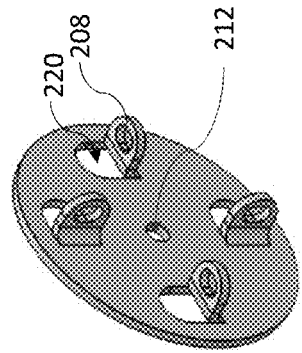
FIG. 18
FIG. 20

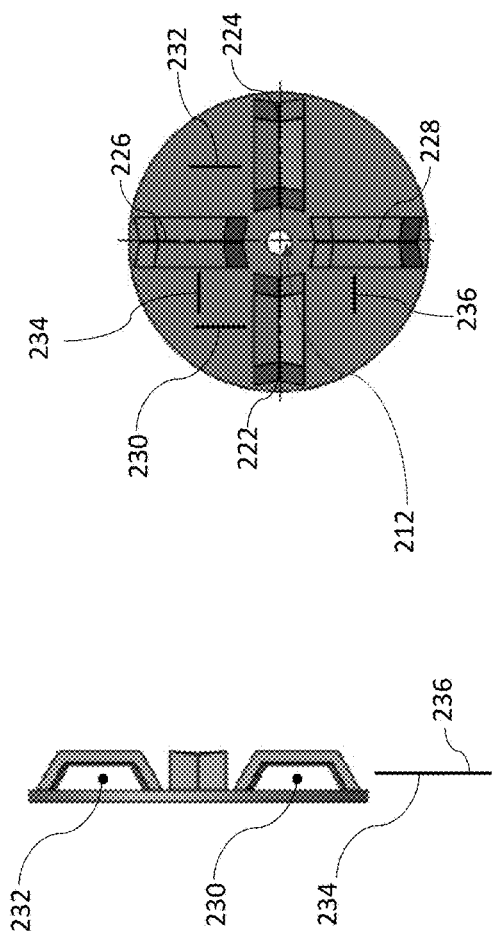
FIG. 23B
FIG. 23A
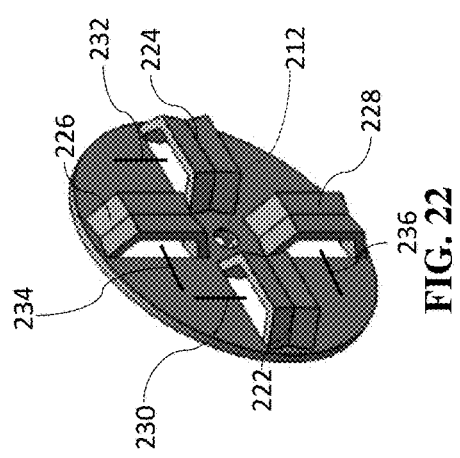
FIG. 22
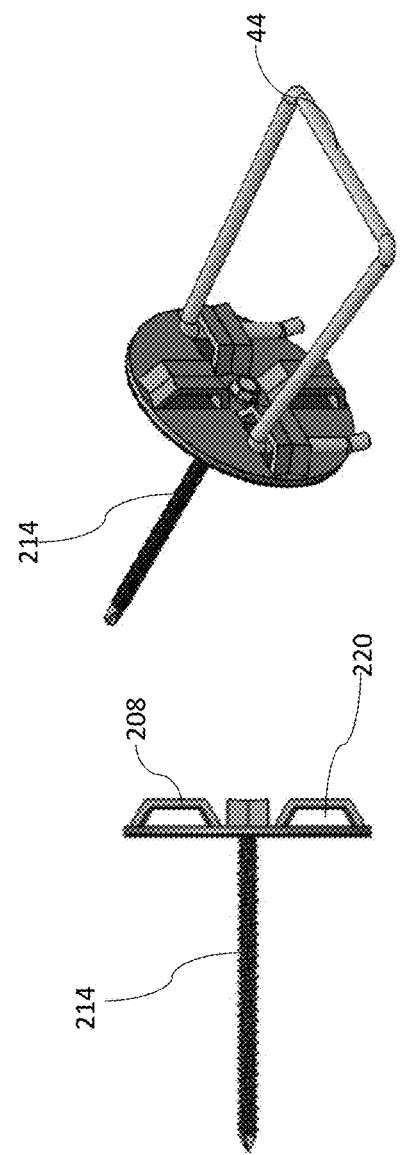
FIG. 25
FIG. 24

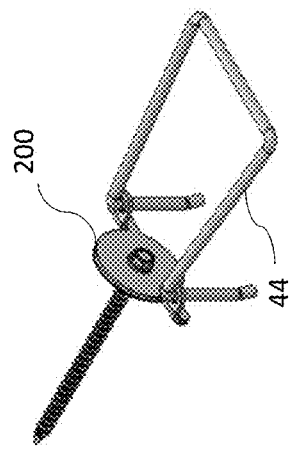
FIG. 29
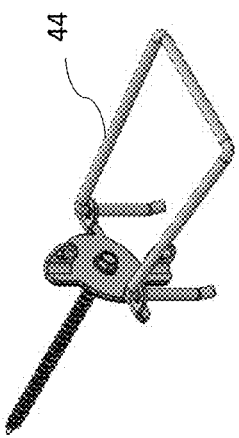
FIG. 32
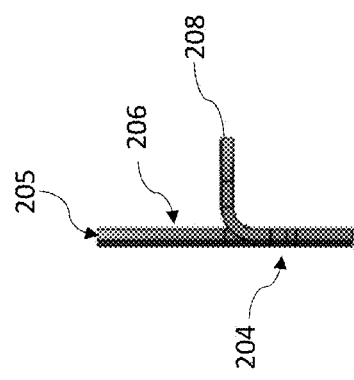
FIG. 28
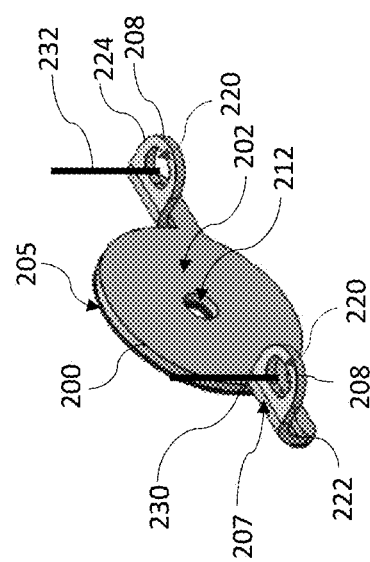
FIG. 27
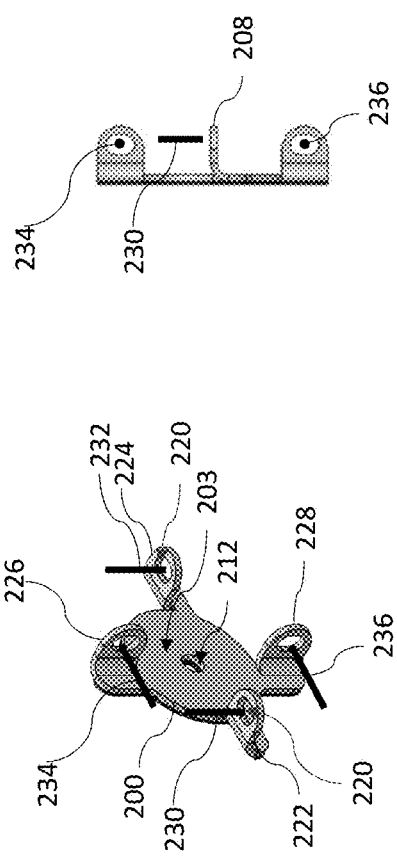
FIG. 31
FIG. 30

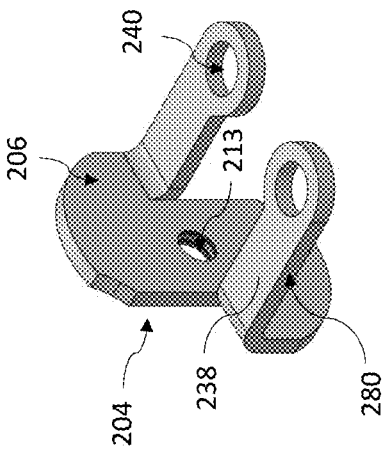
FIG. 35
FIG. 38
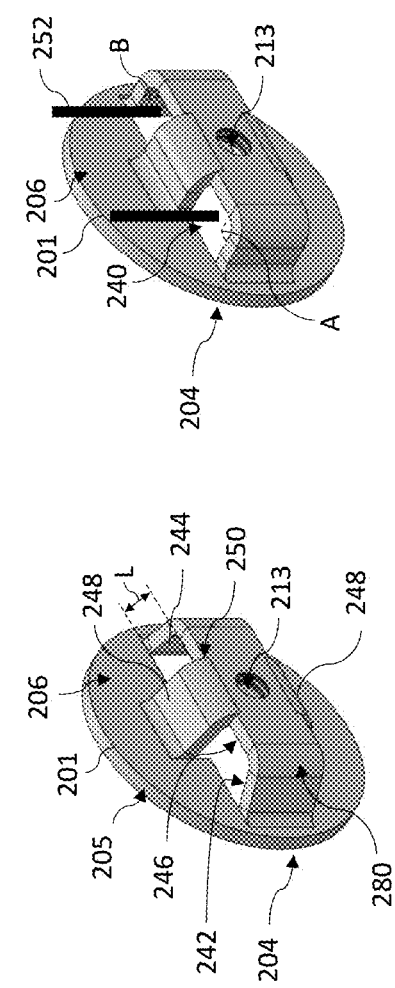
FIG. 34
FIG. 37
FIG. 33
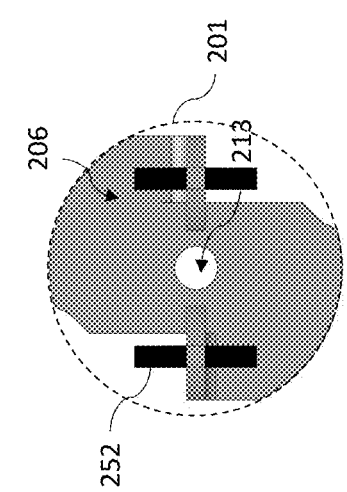
FIG. 36

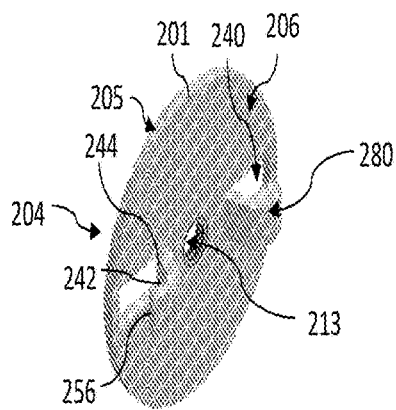 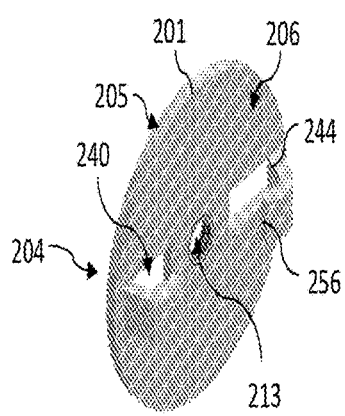 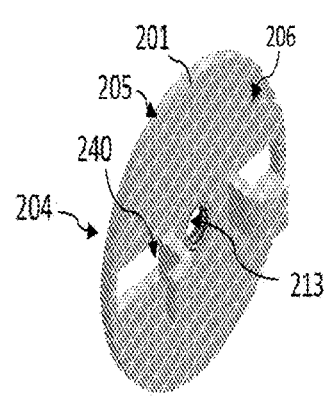
FIG. 39　　　　　　FIG. 40　　　　　　FIG. 41
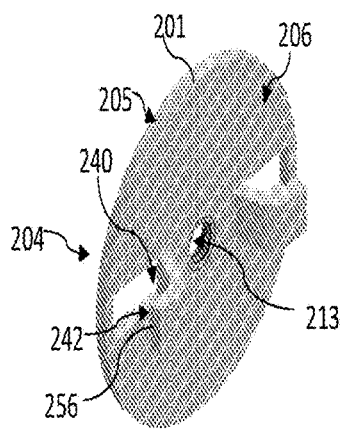 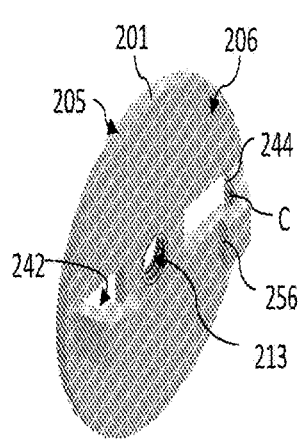 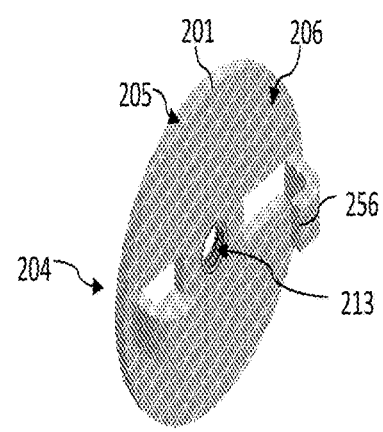
FIG. 42　　　　　　FIG. 43　　　　　　FIG. 44

WALL ANCHOR SYSTEM AND WASHER FOR CONNECTING TO A VENEER TIE

CROSS-REFERENCE TO RELATED APPLICATIONS

This application is a continuation in part application that claims the benefit of U.S. Non-provisional application Ser. No. 16/867,584 entitled "WALL ANCHOR SYSTEM AND WASHER FOR CONNECTING TO A VENEER TIE" and filed May 6, 2020 the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of anchoring systems for cavity walls, and more specifically, to the field of anchoring system washers for connecting to a veneer tie.

BACKGROUND

Minimizing the use of natural resources are vital components of the global strategy to protect the environment and mitigate climate change. The building construction sector represents a large portion of resource consumption. Much of today's anchoring systems require a backup wall to support horizontal transverse loads exerted by a veneer wall. The backup wall typically consists of stud wall, masonry wall, concrete wall, steel elements, etc. Anchoring systems for cavity walls are used to secure veneer walls of a building to overcome seismic and other forces, i.e., wind shear, etc.

A veneer wall is commonly defined as a wall having a facing of masonry units (brick veneer, stone veneer, etc.), or other weather-resisting, non-combustible materials, securely attached to the backup wall, but not so bonded as to exert common action under load intentionally. The veneer wall is supported horizontally by the backup wall via veneer ties embedded in joints on one end and attached to a backup wall anchor on the other end. Typically, the veneer ties the inner wythe and the outer wythe together and is flexible for in-plane horizontal and vertical movement and rigid perpendicular to the wall face. As a result, the veneer wall and the backup wall are isolated and do not behave identically under load. While the displacements perpendicular to the wall are typically the same, the vertical flexibility provided by the veneer tie allows for differences in response to vertical loading.

Current building construction methods require a wall anchor that connects a veneer tie that joins an inner wythe and an outer wythe of the cavity wall—subsequently requiring wall anchors to involve numerous parts. Among one of the numerous essential wall anchor parts, includes a washer. A washer is commonly configured to seal the opening into the inner wythe. Other embodiments of washers may include fastening an anchor bracket to a steel stud. As a result of the number of the wall anchors parts required, maintaining and, or stocking an adequate level of the different parts creates a lot of problems. Therefore, a need exists to improve over the prior art and, more particularly, for an improved washer that allows for the interconnection with veneer ties for use in conjunction with cavity walls having an inner wythe and an outer wythe.

SUMMARY

A wall anchor system and washer for use in a cavity wall is connected to a veneer tie that joins an inner wythe, and an outer wythe of the cavity wall is disclosed. This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a washer for use in a cavity wall to connect to a veneer tie that joins an inner wythe and an outer wythe of the cavity wall is disclosed. The washer includes a hole on the washer body having a threaded hole wall. The washer body having a threaded hole wall consists of a washer body first side, a washer body second side, and a washer body side wall. The washer body having a threaded hole wall includes at least one receiving element configured to receive a portion of the veneer tie protruding from either the first side or the second side.

Additional aspects of the disclosed embodiment will be set forth in part in the Detailed Description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following Detailed Description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2 is a side view of a washer body, according to a first exemplary embodiment of the present invention;

FIG. 3 is a side view of the washer body in contact with a veneer tie, according to the first exemplary embodiment of the present invention;

FIG. 4 is a perspective view of the washer body in contact with the veneer tie, according to the first exemplary embodiment of the present invention;

FIG. 5 is a perspective view of the washer body including an unthreaded opening, according to a second exemplary embodiment of the present invention;

FIG. 6 is a perspective view of a washer body including a threaded opening, according to a third exemplary embodiment of the present invention;

FIG. 7 is a side view of a washer body, according to the third exemplary embodiment of the present invention;

FIG. 8 is a bottom view of the washer body in contact with the veneer tie, according to a fourth exemplary embodiment of the present invention;

FIG. 9 is a first top view of the washer body, according to the fourth exemplary embodiment of the present invention;

FIG. 10 is a perspective view of the washer body in contact with the veneer tie, according to the fourth exemplary embodiment of the present invention;

FIG. 11 is a second top view of the washer body, according to the fourth exemplary embodiment of the present invention;

FIG. 12 is a first side view of the washer body, according to the fourth exemplary embodiment of the present invention;

FIG. 13 is a second side view of the washer body, according to the fourth exemplary embodiment of the present invention;

FIG. 18 is a first perspective view of the washer body, according to a sixth exemplary embodiment of the present invention;

FIG. 19 is a top view of the washer body, according to the sixth exemplary embodiment of the present invention;

FIG. 20 is a second perspective view of the washer body, according to the sixth exemplary embodiment of the present invention;

FIG. 21 is a third perspective view of the washer body in contact with the veneer tie, according to the sixth exemplary embodiment of the present invention;

FIG. 22 is a first perspective view of a washer body, according to a seventh exemplary embodiment of the present invention;

FIG. 23A is a top view of the washer, according to the seventh exemplary embodiment of the present invention;

FIG. 23B is a front view of the washer, according to the seventh exemplary embodiment of the present invention;

FIG. 24 is a second perspective view of the washer body, according to a seventh exemplary embodiment of the present invention;

FIG. 25 is a third perspective view of the washer body in contact with a veneer tie, according to the seventh exemplary embodiment of the present invention;

FIG. 27 is a first perspective view of a washer body, according to an eighth exemplary embodiment of the present invention;

FIG. 28 is a top view of the washer, according to the eighth exemplary embodiment of the present invention;

FIG. 29 is a front view of the washer, according to the eighth exemplary embodiment of the present invention;

FIG. 30 is a second perspective view of the washer body, according to a ninth exemplary embodiment of the present invention;

FIG. 31 is a third perspective view of the washer body in contact with a veneer tie, according to the ninth exemplary embodiment of the present invention;

FIG. 32 is a third perspective view of the washer body in contact with a veneer tie, according to the ninth exemplary embodiment of the present invention;

FIG. 33 is a perspective view of the washer body including with a holder having an opening offset from the washer body, according to an example embodiment;

FIG. 34 is a perspective view of the washer body including with a holder having an opening offset from the washer body, according to an example embodiment;

FIG. 35 is a perspective view of the washer body including a pair of tabs as holders, according to an example embodiment;

FIG. 36 is a top view of the washer body in FIG. 35, according to an example embodiment;

FIG. 37 is a front view of the washer in FIG. 36, according to an example embodiment;

FIG. 38 is a side view of the washer body in FIG. 37, according to an example embodiment;

FIG. 39 is a perspective view of the washer body including a v-shaped holder, according to an example embodiment;

FIG. 40 is a perspective view of the washer body including the v-shaped holder, according to an example embodiment;

FIG. 41 is a perspective view of the washer body including an L-shaped holder, according to an example embodiment;

FIG. 42 is a perspective view of the washer body including the L-shaped holder, according to an example embodiment;

FIG. 43 is a perspective view of the washer body including the L-shaped holder, according to an example embodiment;

FIG. 44 is a perspective view of the washer body including the L-shaped holder, according to an example embodiment.

Like reference numerals refer to like parts throughout the several views of the drawings.

DETAILED DESCRIPTION

Figure 1:
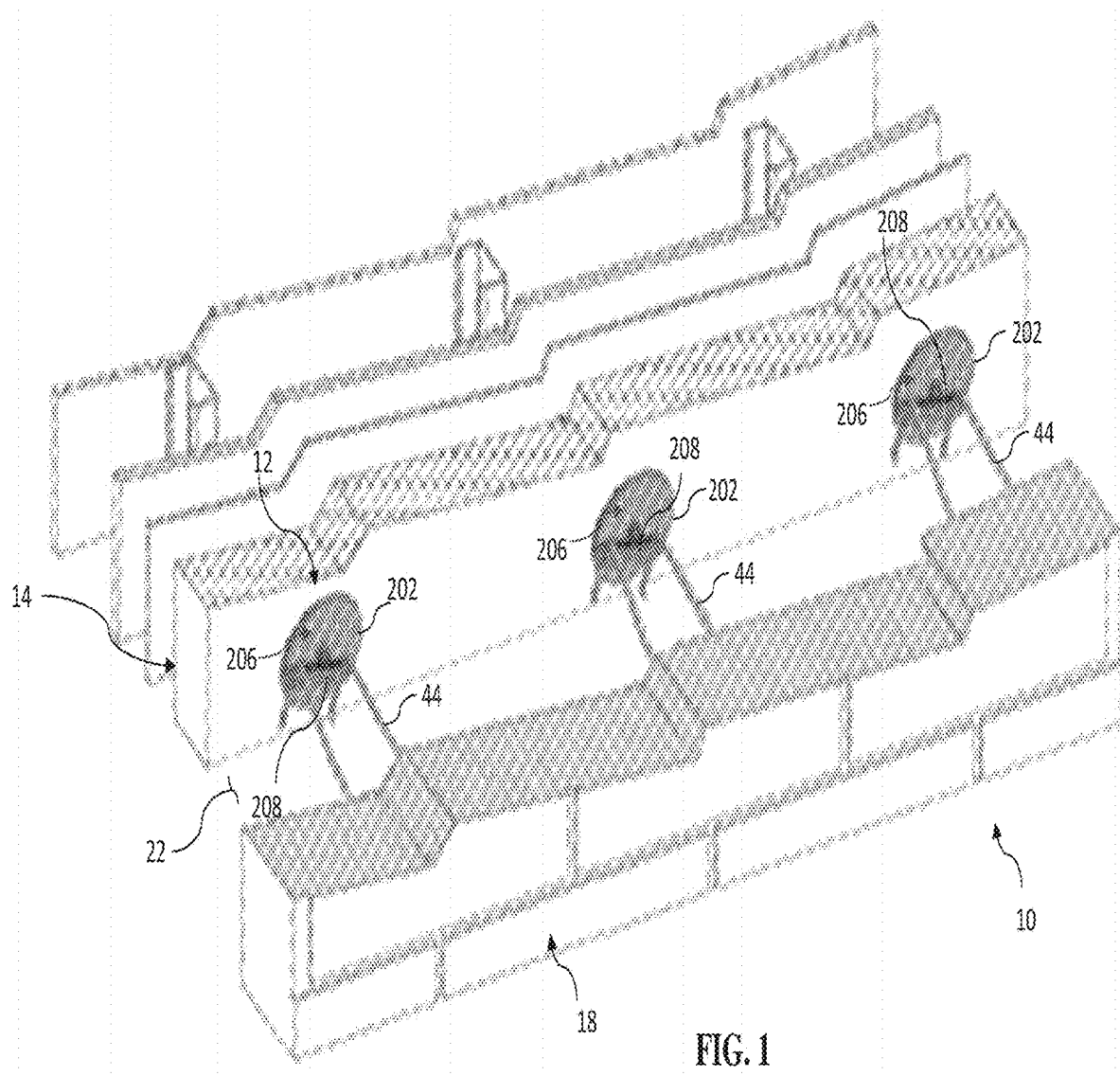
FIG. 1 is a front view of a wall anchor for use in a cavity wall, according to a first exemplary embodiment of the present invention.
Figure 15:
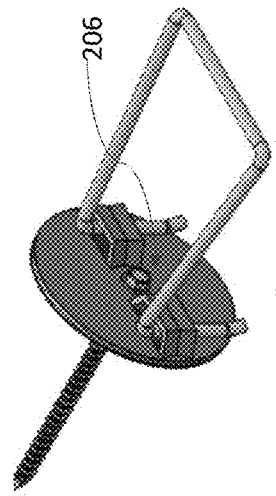
FIG. 15 is a perspective view of the washer body in contact with the veneer tie, according to the fifth exemplary embodiment of the present invention.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The present invention improves upon the prior art by providing an enhanced wall anchor system and washer that includes a hole on its washer body and includes at least one receiving element configured to receive a portion of the veneer tie that joins an inner wythe and an outer wythe of the cavity wall. The present invention further improves upon the prior art by providing an enhanced washer with integral components thereby decreasing the number of parts required for a wall anchor. This would eliminate the assorted wall anchor construct utilizable with various wire formative veneer ties. As a result, the manufacturing costs and storage costs would be lowered, thus improving both logistics and efficiency.

Referring now to FIG. 1, an example cavity wall structure environment 10 configured for a wall anchor to be utilized in is presented according to an example embodiment of the present invention. Environment 10 comprises inner wythe or drywall backup 14 and outer wythe or facing wall 18, which cooperate to form cavity 22. The inner wythe may comprise a single membrane or multiple membranes. In one embodiment, wall anchor is configured to support contact with one or more veneer ties, wall ties, or any other wire or sheet metal devices used to connect two or more masonry wythes or used to connect masonry veneers to a structural backing system. It is to be understood that structures other than environment 10 may be suitable for wall anchor 12 to be utilized without departing from the scope of the invention. In one embodiment, wall anchor 12 may comprise a washer, referred to as a washer body 202 throughout the disclosure, configured to function as at least one component or as an integrateable component of wall anchor 12, and further configured to assist wall anchor 12 in utilizing a veneer tie 44 to join inner wythe 14 to outer wythe 18 for horizontal load transfer.

In one embodiment, the example cavity wall structure environment 10 is configured for a system for connecting one or more veneer ties 44 designed for joining inner wythe 14 and outer wythe 18. In one embodiment, the system comprises veneer tie 44 and wall anchor 12 further comprising an anchor shaft first end portion and an anchor shaft second end portion, wherein the anchor shaft first end portion is configured to be secured to inner wythe 14 and the anchor shaft second end portion is configured to be threadedly attached with an opening associated with the washer, which is described in greater detail below. In one embodiment, wall anchor 12 may position the washer in a manner that abuts against the outer most surface of inner wythe 14 or one or more membranes of inner wythe 14. In other embodiments, the washer be attached to the inner wythe by using other methods. For example, the washer may be attached to the inner wythe without requiring a threaded hole. For example, the washer body may be attached to the inner wythe using a bolt or other item configured to pass through a non-threaded hole that attaches the washer to the inner wythe.

Referring to FIGS. 2-25, wall anchor 12 comprises a washer body 202 comprising a washer body first side 204, a washer body side wall 205, a washer body second side 206, at least one receiving element 208, at least one axis 210, and at least one opening or aperture 212. It is to be understood that wall anchor 12 may comprise multiple of any component disclosed herewith as long as wall anchor and washer body 202 may utilize said additional components for the intended functionality. In one embodiment, receiving element 208 is configured to protrude or extend from washer body first side 204 to washer body second side 206 wherein receiving element 208 is further configured to receive a portion of veneer tie 44. In other embodiments, the receiving element extends only from the second side 206. In one embodiment, receiving element 208 may receive the portion of veneer tie 44 via a receiving element opening 220, an aperture 212 is dimensioned to axially receive and mate with a shaft 214, which may be associated with wall anchor 12, supporting full integration between washer body 202 and the surface of inner wythe 14 strengthened by the impaling and tightening of the shaft 214 through opening 212. In one or more embodiments, washer body 202 supports an integral configuration, as depicted in FIG. 4, wherein receiving element 208 is integrated into a surface associated with washer body 202, allowing veneer tie 44 to be attached or affixed directly on a surface of washer body 202 via receiving element 208.

In other words, receiving element 208 is formed from a surface portion of at least washer body first side 204 or washer body second side 206, and the receiving element opening 220 is allocated to receiving element 208. As described herein, a surface portion of washer body 202 may be any panel configured to be punched out, carved out, outward protruding, or sculpted in order to generate receiving element opening 220 shaped and sized to fit at least a portion of a veneer tie 44. It should be appreciated that washer body 202 may have other shapes, dimensions, and orientations that allow washer body 202 to connect to veneer tie 44 and join inner wythe 14 and outer wythe 18, and receiving element 208 may be shaped, sized, and located in various arrangements that allow direct outward protrusion from washer body 202, such variations are within the spirit and scope of the claimed invention. In one embodiment, receiving element 208 and/or receiving element opening 220 may comprise neoprene or any other applicable material disposed along with the interior in order to combat degradation commonly sustained by wall anchor systems and their components. In one embodiment, washer body sides 204 and 206 are configured to comprise a plurality of dimples, grooves, embossing, or any other applicable features known to those of ordinary skill in the art that still allows washer body 202 to serve its intended functionality.

In one embodiment, opening 212 may comprise a threaded wall section configured to interact with shaft 214, which may be a threaded shaft configured to interlace or interlock with the threaded wall section in order to provide efficient retention of washer body 202 to inner wythe 14. In other embodiments, opening 212 may not comprise a threaded wall section. In one embodiment, the interactive configuration between opening 212 and shaft 214 may be accomplished by a screw, bolt, nail, rivet, or any other applicable mechanism for affixing and retaining washer body 202 to an applicable structure. In application, shaft 214 bores or penetrates through opening 212 resulting in washer body 202 being retained and subsequently washer body 202 abuts at least a surface of inner wythe 14 allowing veneer tie 44 to be attached, interlaced, or any other applicable means of affixing to receiving element 208, as depicted in FIGS. 3 & 4. In one embodiment, axis 210 serves as a centrally located axis, as illustrated in FIG. 2, configured to support loosening and tightening respective to inner wythe 14 and/or shaft 214. It is to be understood that axis 210 may be applicable to each receiving element 208 or receiving element opening 220 depending upon the configuration of wall anchor 12.

In one embodiment, receiving element 208 is defined by an elongated u-shaped body, as illustrated by FIGS. 1-7, in which at least washer body first side 204 and/or washer body second side 206 define receiving element opening 220 as a protruding surface integral to washer body 202. The elongated u-shaped may be formed based off the protruding surface or a plurality of protrusions from washer body first side 204, washer body side wall 205, and/or washer body second side 206; as long as the receiving element opening 220 is shaped and sized to support direct contact with a portion of veneer tie 44. It should be appreciated that receiving element 208 can have other shapes, dimensions, and orientations that allow washer body 202 to connect to a portion of veneer tie 44, such variations are within the spirit and scope of the claimed invention. For example, receiving element 208 may be a plurality of receiving elements 208 manifested as extending or outward protruding tabs, flanges, or any other applicable mechanism comprising openings configured to be attached to which are disposed along one or more surfaces of washer body 202 wherein each receiving element 208 comprises its own receiving element opening 220 and is associated with one or more axes 210 supporting loosening and tightening of washer body 202 to a surface of inner wythe 14 while remaining integral components of washer body 202, as illustrated in FIGS. 8-25. In another example, FIGS. 10, 15, 21, and 25 illustrate various embodiments of washer body 202 comprising a plurality of receiving elements 208 each of which comprises at least one receiving element opening 220 configured for a portion of veneer tie 44 to be hooked, attached, clamped, clasped, or any other applicable form of affixing to without damaging or compromising veneer tie 44. The various integrated configurations of washer body 202 allow for the reduction of upkeep of multiple cumbersome components associated with the prior art that are required in order to affix a washer to an inner wythe.

In one embodiment, washer body first side 204 comprises a sealing material 216 and washer body second side 206 comprises a structural element 218, as illustrated in FIGS. 6 & 7. In one embodiment, each of both washer body first side 204 and washer body second side 206 comprises sealing material 216 connected with structural element 218. In one embodiment, washer body 202 is configured to be moved angularly horizontally (represented by line A) via an applied force inherent to interactions with washer body 202, as depicted in FIG. 3, in which structural element 218 is configured to resist movement caused by the applied force. Sealing material 216 is configured to seal washer body 202 against the inner wythe 14, generating a barrier-like structure configured to seal the connection between shaft 214 and opening 212 when shaft 214 is impaled through opening 212. Sealing material 216 may be composed of neoprene, EPDM, foam, Ariaprene®, rubber, or any other applicable material configured to be comprised in a washer. Some other compressible materials for seal material may include polyurethane, silicone, polyether, plastic, thermoplastic, open-cell foam, closed-cell foam, and acrylic.

Structural element 218 may be composed of a metallic material, a non-metallic material, or any combination thereof. In application, sealing material 216 is configured to be connected or affixed to structural element 218 wherein sealing material 216 abuts an outward facing surface or one or more membranes of inner wythe 14. Types of non-metallic material for structural element made from a high temperature material comprising at least one of an ablative material, a boron fiber material, a carbon fiber material, a ceramic matrix composite material, a composite material, an epoxy matrix composite, a fatigue composite material, a fiber composite, a fiber-matrix interface, a filament material, a filament wound structures composite material, a filament-matrix material, a flammability composite materials, a glass fiber reinforced plastic material, a honeycomb material, an insulation composite material, a laminate material, a metal filament system, a metal matrix composite (MMC), a nano-composite, an off-gassing/out-gassing composite material, a polymer matrix composite, a reinforcing fibers composite material, a stacking sequence composite material, a surface property composite material, whisker composite, a woven composite material, or any combination of the foregoing materials.

Figure 17:
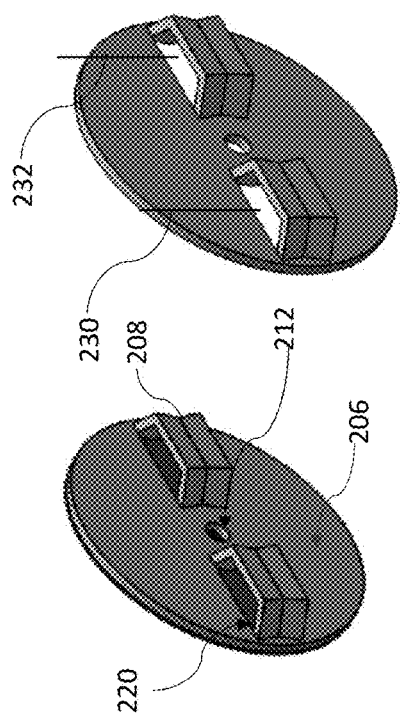
FIG. 17 is a perspective view of the washer body, according to the fifth exemplary embodiment of the present invention.
Figure 14:
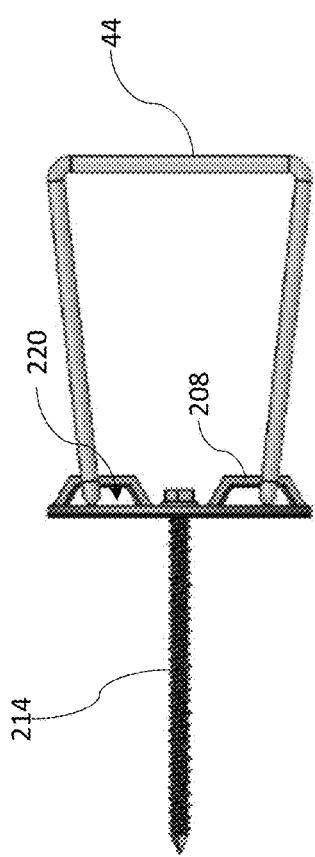
FIG. 14 is a first top view of the washer body in contact with the veneer tie, according to a fifth exemplary embodiment of the present invention.
Figure 16:
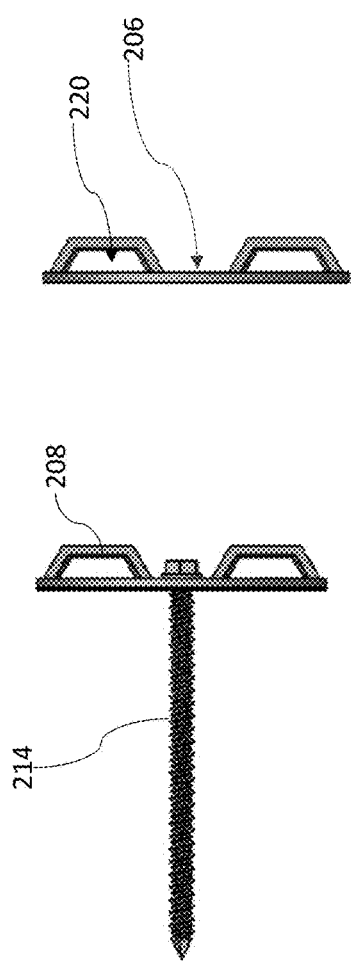
FIG. 16 is a second top view of the washer body, according to the fifth exemplary embodiment of the present invention.

In one embodiment, washer body 202 comprises a plurality of receiving elements 208, in particular two, wherein the plurality of receiving elements 208 are disposed of across a surface of washer body 202 in a manner in which each of the plurality of receiving elements 208 is equidistant from opening 212, as illustrated in FIGS. 12 & 17. This configuration allows a first portion and a second portion of veneer tie 44 to be attached respectively to each of the equidistant receiving elements 208 via receiving element openings 220.

In one embodiment, washer body 202 comprises four equidistant receiving elements 208 respective to opening 212, wherein a first receiving element 222 is positioned to the left of opening 212, a second receiving element 224 is positioned to the right of opening 212, a third receiving element 226 is positioned directly above opening 212, and a fourth receiving element 228 is positioned directly below opening 212, as illustrated in FIGS. 19 & 22. First receiving element 222 comprises a first longitudinal axis 230 in a first direction, second receiving element 224 comprises a second longitudinal axis 232 in the first direction, third receiving element 226 comprises a third longitudinal axis 234 in a second direction, and receiving element 228 comprises a fourth longitudinal axis 236 in the second direction wherein the first direction is perpendicular to the second direction. It is to be understood that each of receiving elements 222-228 comprises a receiving element opening 220 that may be manifested via an extended tab, loop, handle, grip, or any other applicable mechanism configured to come into direct contact and maintain retention of a portion of a veneer tie via an integral configuration with washer body 202. Each configuration comprising more than one receiving element is configured to be symmetrical in order to support greater angular movement in a plane with respect to the longitudinal axes. In one embodiment, each of receiving elements 222-228 and/or receiving element openings 220 may comprise neoprene or any other applicable material disposed along with the interior. This configuration allows for the first portion of veneer tie 44 to be affixed to receiving element opening 220 associated with first receiving element 222 or third receiving element 226, and the second portion of veneer tie 44 to be affixed to receiving element opening 220 associated with second receiving element 224 or third receiving element 228. Thus, the first and second portions of veneer tie 44 are respectively affixed to directly opposing receiving element openings 220 allowing the perpendicular longitudinal axes to serve as a reference for greater angular movement of washer body 202 in the plane configured to comprise at least first longitudinal axis 230 and second longitudinal axis 232 in the two equidistant receiving elements configuration and a first longitudinal axis 230, second longitudinal axis 232, third longitudinal axis 234, and fourth longitudinal axis 236 in the four equidistant receiving elements configuration.

In one embodiment, the washer includes the washer body 202 having a perimeter 201, the washer body first side 204, the washer body second side 206, and the washer body side wall 205. A hole 213 is substantially centrally located and through the washer body. At least one holder 280 is formed within the perimeter and protruding from at least one of the washer body first side and washer body second side. In certain embodiments, the holder includes a first walled portion, a second walled portion, and third walled portion. The second walled portion opposes and at least partially faces the first walled portion. The third walled portion connects the first walled portion to the second walled portion. The walled portions are configured to create an enclosed space that receives a portion of a veneer tie.

Referring to FIGS. 33 and 34, in one embodiment, the holder is formed within the perimeter 201 of the washer body and includes at least one space 240 that receives a vertical leg of a veneer tie. The holder extends from at least one of the washer body first side and washer body second side. Because the holder is integral to the washer body, the holder may be formed as if it were punched out from the washer body or formed directly from the washer body. In other embodiments, the holders may be attached to the washer body. The size of the space 240 is configured to allow the vertical leg of a veneer tie to be inserted into the holder. The space is defined by the first walled portion 242, the second walled portion 244, and the third walled portion 246 that connects the first walled portion with the second walled portion. The first walled portion first end is attached to at least one of the washer body first side and washer body second side. The second walled portion first end is attached to at least one of the washer body first side and washer body second side. The ends of the holder, where the first walled portion and second walled portion meet the washer body, may curve out from the washer body and are within the perimeter. The ends of the holder may also be perpendicular to the washer body. The first walled portion at least partially faces the second walled portion. In one embodiment, the first walled portion directly faces the second walled portion such that the first walled portion, second walled portion and third walled portion forms a u shape (similar to FIG. 34). The shape of the walled portion of the holder includes a first angle A between the first walled portion and the third portion and a second angle B between the second walled portion and third walled portion. The first angle A and second angle B may be equal allowing the washer to uniformly hold the vertical legs of a veneer tie. The first angle and the second angle may be at least 90 degrees. Other angles may be used as long as the vertical leg of the veneer tie is securely held within the space 240 of the holder that is within the spirit and scope of the present invention. The area where the first walled portion and second walled portion connect to the third walled portion may be straight or curved. The outer surfaces of the first walled portion, second walled portion, and third walled portion are smooth and straight. The third walled portion is parallel to the washer body second side.

The washer body may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The washer body may be made of other materials and is within the spirit and the disclosure. The washer body may be formed from a single piece. The components of the washer body may be manufactured from a variety of different processes including an extrusion process, a mold, welding, shearing, punching, welding, folding etc. However, other types of processes may also be used and are within the spirit and scope of the present invention.

The holder may be merged with the washer body during the process of creating the washer body. The holder may be made of the same material as the washer body. The holder may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The holder may be made of other materials and is within the spirit and the disclosure. The holder may be formed from a single piece. The components of the holder may be manufactured from a variety of different processes including an extrusion process, a mold, welding, shearing, punching welding, folding etc. However, other types of processes may also be used and are within the spirit and scope of the present invention. Manufacturing the washer including the holder as one whole piece may only reduce the cost of the washer by only a fraction. However, because hundreds of washers are used per building, the process of manufacturing the components of the washer as one whole piece saves resources and reduces expenses per building.

A hole 213 is substantially centrally located within the perimeter of the washer body and through the holder as depicted in FIGS. 33 and 34. The hole is configured for receiving a shaft that anchors the washer to the inner wythe. In some embodiments the hole may be threaded to receive the threads on the shaft. The hole is offset by an offset length L from the washer body such that the hole is on the holder and offset away from the washer body and such that the space 240 can have a vertical portion of the veneer tie inserted into it. The washer body also includes at least one leg 248 extending from at least one of the washer body first side and washer body second side. The leg 48 is in attachment with a side portion 250 of the holder that is offset from the washer body. The leg may act as a supplemental support member and may be substantially perpendicular such that the leg is positioned in between the two vertical legs of the veneer tie. The leg may also substantially curve from the end on the washer body to the end on the side portion holder. A second leg may be positioned on the opposite side of the side portion holder 250. The opposing legs on each side of the holder provide additional structure to the washer body in order to securely hold the vertical legs of the veneer tie while the washer body is attached to the inner wythe via the shaft.

Referring to FIGS. 35-38, in one embodiment, the washer body includes a hole 213 substantially centrally located and through the washer body. The hole may be threaded to receive the threads from the shaft. At least one holder protrudes from at least one of the washer body first side and washer body second side. The holder 280 includes a space 240 positioned within the perimeter 201 wherein the space is configured for receiving a vertical leg of the veneer tie. In FIGS. 36-37, element 252 is meant to illustrate where the veneer tie is received by the holder. The space 240 may be enclosed as depicted in FIGS. 35 and 36. However, in other embodiments, the space 240 may not be fully enclosed and form a hook that is configured to receive the veneer tie. The holder may be a tab 238 that is integral with and extends from the washer body such that the space is positioned away from the washer body and within the perimeter (illustrated as 201 in FIG. 37). In one embodiment, the tab is flat and elongated. However, in other embodiments other shapes may be used and are within the spirit and scope of the present invention. In one embodiment, the thickness of the tab is similar to the thickness of the washer body side wall 205.

The tab 238 of each holder may be integral with the washer body and formed during the process of manufacturing the washer body. The tab may be made of the same material as the washer body. The tab may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The tab may be made of other materials and is within the spirit and the disclosure. The tab may be formed from a single piece. The components of the tab may be manufactured from a variety of different processes including an extrusion process, a mold, welding, shearing, punching, welding, folding etc. However, other types of processes may also be used and are within the spirit and scope of the present invention. The one end of the tab may bend outwards from perimeter of the washer body such that the tab is perpendicular to the washer body second side. The space 240 is positioned near the other end of the tab of the holder allowing a vertical leg of the veneer tie to be held at least a second distance D from the washer body. The end of the tab is shaped to form the space in the holder that holds the vertical legs. The end of the tab may be circular, square, or any shape. The space may be fully enclosed. In one embodiment, the space define a circular shape. However, other shapes may also be used and are within the spirit and scope of the present invention. Other shapes for the space may be used that are configured to hold a vertical leg of the veneer tie may be used. The end of the tab with the space may not be fully enclosed such that the end of the holder forms a hook or a u-shaped end. In FIGS. 35-37, the tab includes a circular portion 254 of the holder having the space 240 therein. The circular portion may form a hook, u-shape, or a semi-circle (not illustrated). The hook or u-shaped end may be a semi-circle long enough to prevent the vertical leg of the veneer tie from the sliding out. The space stays within the perimeter 201 of the washer body although the holder extends from the perimeter.

Referring now to FIGS. 39-44, in one embodiment, the holder 280 includes the first walled portion 242 and the second walled portion 244. The holder may be punched out form the washer body or is attached hereto via one of the walled portions. The holder includes a terminating end 256 such that either the first walled portion or second walled portion is not attached to the washer body. Angle C may be varied depending on the use of the device.

For example, angle C may be varied to form a v, u, or 1 shape by the first and second walled portions. However, other shapes for the holders extending from the washer body may be used and are within the spirit and scope of the present invention. For example, the second walled portion at least partially faces the first walled portion such that the holder is v-shaped. The angle C between the first walled portion and second walled portion is less than 90 degrees causing the edge where the first walled portion and the second walled portion meet to be more rounded.

The walled portion 242 without the terminating end extends outward away from the midpoint of the washer body. Because the second walled portion, at least in some embodiments (such as in FIG. 40) partially faces the first walled portion, the terminating end 256 of the holder is angled towards the washer body. The terminating end faces inwards towards the walled portion that is attached to the washer body.

In one embodiment, the second walled portion 244 at least partially faces the washer body such that the holder is L-shaped (such as FIG. 42). The holder may be punched out from the washer body or is attached hereto via one of the walled portions. The angle C between the first walled portion and the second walled portion may be at least 90 degrees such that the terminating end of the holder is not facing the washer body.

The terminating end of the first walled portion may in some embodiments face outward (FIG. 42), in some embodiments face inward (toward each other (FIG. 44), and in some embodiments, face inward (FIG. 45) toward the washer body. The portion of the holder where the first walled portion and the second walled portion meet may be rounded or in other embodiments may be more angled. In all embodiments in FIGS. 39-45, each holder includes the space 240 that receives the vertical leg of the veneer tie such that the holders of the washer body may hold the vertical legs of the veneer tie.

Figure 47:
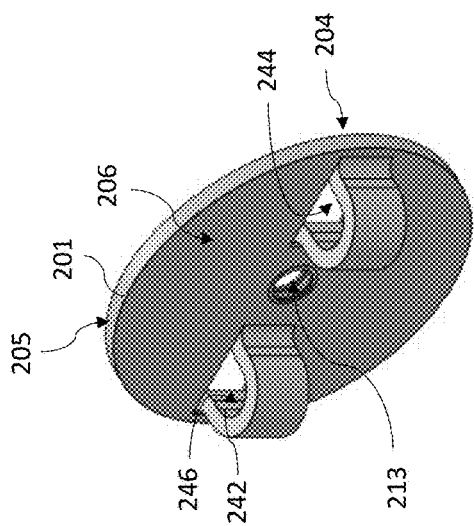
FIG. 47 is a perspective view of the washer body including the u-shaped holder, according to an example embodiment.
Figure 46:
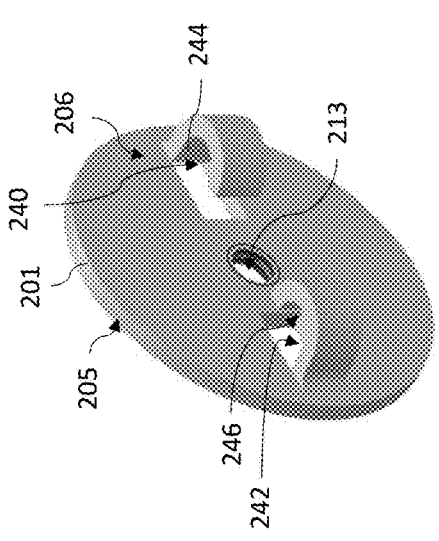
FIG. 46 is a perspective view of the washer body including the u-shaped holder, according to an example embodiment.
Figure 45:
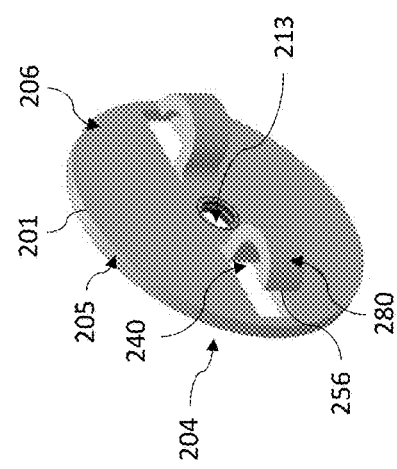
FIG. 45 is a perspective view of the washer body including a u-shaped holder, according to an example embodiment.

Referring now to FIGS. 45-47, in some embodiments, at least a portion of the second walled portion opposes and faces the first walled portion such that a u-shape holder 280 is formed. The holder includes the third walled portion 246 that connects the first walled portion 242 to the second walled portion 244. The holder is u-shaped because the third walled portion is convex while the first walled portion and second walled portion bends out from the washer body. Convex means that the third walled portion curves outwards and away from the washer body. The holder may be punched out from the washer body or is attached hereto via one of the walled portions. The holder includes the enclosed space that is configured for receiving the vertical leg of the veneer tie. In one embodiment, the holder may include the terminating end 256 on either the first walled portion or the second walled portion. Because the second walled portion directly faces the first walled portion, the terminating end may face the washer body and away from the walled portion that is attached to the washer body. The holder still includes the space configured for holding the vertical leg of the veneer tie. The shape of the holder surrounds the vertical leg more than the v-shape or the L-shape because the terminating end is closer to the washer body.

Figure 26:
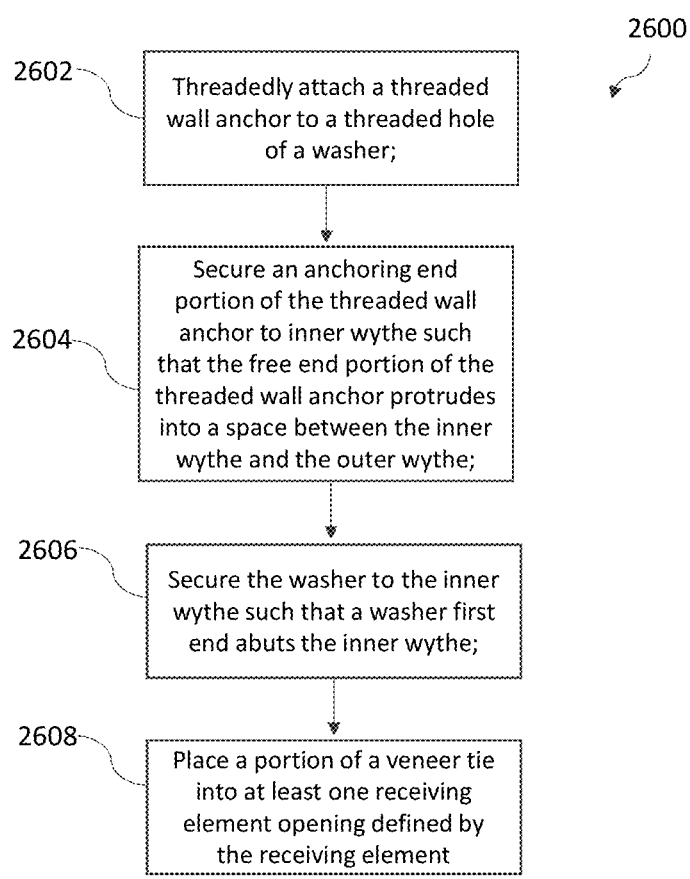
FIG. 26 is a block diagram depicting an exemplary method for anchoring a veneer wall to an inner wythe for horizontal load transfer, according to an exemplary embodiment of the present invention.

Referring now to FIG. 26, a method 2600 for anchoring a veneer wall to inner wythe 14 for horizontal load transfer is depicted. In step 2602, wall anchor 12 is threadedly attached to opening 212 of washer body 202, wherein wall anchor 12 may serve as a component of an anchoring system associated with shaft 214. As mentioned above, in other embodiments, the opening 212 may also not be threaded. In one embodiment, the anchor shaft first end portion associated with wall anchor 12 assists in securing wall anchor 12 to inner wythe 14. Shaft 214 interacts and integrates with one or more threaded wall sections of opening 212, allowing washer body 202 to be fully integrated with wall anchor 12. In step 2604, once wall anchor 12 has been threadedly attached to opening 212, the second end portion associated with wall anchor 12, also referred to as the free end portion of wall anchor 12, protrudes into cavity 22, which is a space formed between inner wythe 14 and outer wythe 18, and a portion of wall anchor 12 is secured to inner wythe 14, as depicted in FIG. 3. In one embodiment, the anchor shaft first end portion is secured to inner wythe 14 while the anchor shaft second end portion is threadedly attached or affixed to opening 212 allowing the full body of the anchor shaft to extend from inner wythe 14 to cavity 22 and/or outer wythe 18 depending on the configuration of wall anchor 12. As mentioned above, the washer body may also be configured to be attached using an opening 212 that is not threaded by using some other type of means. It is to be understood that veneer tie 44 may occupy space in both cavity 22 and outer wythe 18 subject to the configuration and length of veneer tie 44. In step 2606, washer body 202 is secured to inner wythe 14 in such a manner that washer body first side 204 abuts against the outer most surface of inner wythe 14 or one or more membranes of inner wythe 14. It is to be understood that at least one or more surfaces of washer body 202 are to be abutting with at least one surface associated with inner wythe 14 once wall anchor 12 has successfully been threadedly attached (or otherwise attached) to opening 212, and anchor shaft first end secures the abutting relationship between washer body 202 and inner wythe 14. In step 2608, a portion of veneer tie 44 is placed in at least one receiving element 208 via the portion of veneer tie 44 interacting with receiving element opening 220 defined by receiving element 208. It is to be understood that the amount of portions of veneer tie 44 interacting with the plurality of receiving element openings 220 is subject to the applicable configuration of wall anchor 12 and/or washer body 202. In other words, the more receiving elements 208 available based on the configuration of washer body 202, the more portions of veneer tie 44 may be hooked, interlaced or attached to washer body 202 via the receiving element openings 220.

In another embodiment, washer body 202 comprises of two equidistant receiving elements 208 that defines an extension element 207 that extends radially outward from the main perimeter 200 of the washer body as illustrated in FIGS. 27-29. In the present embodiment illustrated in FIGS. 27-29, the perimeter defines a circular shaped perimeter. However, other shapes may also be used and are within the spirit and scope of the present invention. First receiving element 222 comprises a first longitudinal axis 230 in a first direction and second receiving element 224 comprises a second longitudinal axis 232 in the first direction. It is to be understood that each of above-mentioned receiving elements 222, 224 comprises a receiving element opening 220 that may be manifested via an extended tab, loop, winged element, handle, grip, or any other applicable mechanism configured to come into direct contact and maintain retention of a portion of a veneer tie via an integral configuration with washer body 202. In other words, the receiving element structure is integral with the material of the side of the washer body. Other embodiments that extend out from the main perimeter 200 may also be used and are within the spirit and scope of the present invention. Each configuration that includes more than one receiving element may be symmetrical in order to support greater angular movement in a plane with respect to the longitudinal axes. In one example embodiment, each of receiving elements 222, 224 and/or receiving element openings 220 may comprise neoprene or any other applicable material disposed along with the interior. The opening 212 may be threaded so that it is configured to receive the threaded elongated shaft and attached directly to the inner wythe.

In another embodiment, washer body 202 comprises of four equidistant receiving elements 208 that defines an extension element 207 that extends radially outward from the main perimeter 200 of the washer body as illustrated in FIGS. 30-32. First receiving element 222 comprises a first longitudinal axis 230 in a first direction, second receiving element 224 comprises a second longitudinal axis 232 in the first direction, third receiving element 226 comprises a third longitudinal axis 234 in a second direction, and receiving element 228 comprises a fourth longitudinal axis 236 in the second direction wherein the first direction is perpendicular to the second direction. It is to be understood that each of above-mentioned receiving elements 222, 224, 226, 228 comprises a receiving element opening 220 that may be manifested via an extended tab, loop, handle, grip, or any other applicable mechanism configured to come into direct contact and maintain retention of a portion of a veneer tie via an integral configuration with washer body 202. Each configuration comprising more than one receiving element is configured to be symmetrical in order to support greater angular movement in a plane with respect to the longitudinal axes. In one example embodiment, each of receiving elements 222, 224, 226, 228 and/or receiving element openings 220 may comprise neoprene or any other applicable material disposed along with the interior. As explained above, the receiving elements protrude outward from the side of the washer body and (as illustrated in FIG. 27-32 the receiving elements extend radially outward from the main perimeter 200 of the washer body.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A washer for use in a cavity wall to connect to a veneer tie that joins an inner wythe and an outer wythe of the cavity wall comprising:
    a washer body having a perimeter, a washer body first side, a washer body second side and a washer body side wall;
    a hole substantially centrally located in and completely surrounded by the perimeter of the washer body, the hole penetrating through the washer body; and
    at least one holder formed within the perimeter and protruding from at least one of the washer body first side and the washer body second side, wherein the at least one holder is configured for receiving a portion of the veneer tie.

2. The washer of claim 1, wherein the at least one holder is configured to receive at least two legs of the veneer tie.

3. The washer of claim 1, wherein the hole is threaded.

4. The washer of claim 1, wherein the at least one holder is formed from the washer body.

5. The washer of claim 1, wherein the at least one holder comprises a space configured for receiving a vertical leg of the veneer tie.

6. The washer of claim 5, wherein the at least one holder comprises:
    a first walled portion; and,
    a second walled portion at least partially facing the first walled portion.

7. The washer of claim 5, wherein the at least one holder comprises:
    a first walled portion; and,
    a second walled portion at least partially facing the washer body.

8. The washer of claim 1, wherein the at least one holder comprises an enclosed space configured for receiving a vertical leg of the veneer tie.

9. The washer of claim 8, wherein the at least one holder comprises:
    a first walled portion;

a second walled portion opposing and facing the first walled portion; and, a third walled portion connecting the first walled portion to the second walled portion.

10. The washer of claim 6, wherein the at least one holder further comprises:

a first walled portion first end is attached to at least one of the washer body first side and the washer body second side; and a second walled portion first end is attached to at least one of the washer body first side and the washer body second side.

11. A washer for use in a cavity wall to connect to a veneer tie that joins an inner wythe and an outer wythe of the cavity wall comprising:

a washer body having a perimeter, a washer body first side, a washer body second side and a washer body side wall;

at least one holder formed within the perimeter and extending from at least one of the washer body first side and the washer body second side;

a space between the at least one holder and at least one of the washer body first side and the washer body second side configured for receiving a portion of the veneer tie; and a hole substantially centrally located within and completely surrounded by the perimeter of the washer body, the hole penetrating through the at least one holder, wherein the hole is configured for receiving a shaft that anchors the washer to the inner wythe.

12. The washer of claim 11, wherein the space is an enclosed space configured for receiving a vertical leg of the veneer tie.

13. The washer of claim 11, wherein the space is configured for receiving a vertical leg of the veneer tie.

14. The washer of claim 11, wherein the hole is offset from the washer body.

15. The washer of claim 14, wherein at least one leg extending from at least one of the washer body first side and the washer body second side attaches to a side portion holder that is offset from the washer body.

16. A wall anchor system for use in a cavity wall to join an inner wythe and an outer wythe of the cavity wall, the wall anchor system comprising:

a veneer tie comprising a first leg;

a shaft configured to secure into the inner wythe; and a washer comprising:

a washer body having a perimeter, a washer body first side, a washer body second side and a washer body side wall;

a hole substantially centrally located in and completely surrounded by the perimeter of the washer body, the hole penetrating through the washer body, wherein the hole is configured for the shaft to extend therethrough; and at least one holder formed from the washer body and located within the perimeter, the at least one holder protruding from the first side of the washer body and defining an opening configured to receive the first leg between the holder and the washer body.

17. The wall anchor system of claim 16, wherein the washer body is configured for angular movement about the shaft.

18. The wall anchor system of claim 16, wherein the hole is threaded, the shaft is threaded, and the washer body is configured for translational movement along the shaft relative to the inner wythe.

19. The wall anchor system of claim 16, wherein the at least one holder comprises a first holder and a second holder, the first and second holder positioned symmetrically on opposing sides of the hole, and wherein the veneer tie further comprises a second leg wherein the first holder is configured to receive the first leg and the second holder is configured to receive the second leg.

20. The wall anchor system of claim 19, wherein the washer body and first and second legs of the veneer tie are configured for angular movement about the shaft.

* * * * *